(12) United States Patent
Filart et al.

(10) Patent No.: US 10,986,501 B2
(45) Date of Patent: Apr. 20, 2021

(54) SECURE TELEPHONE IDENTITY (STI) CERTIFICATE MANAGEMENT SYSTEM

(71) Applicant: T-Mobile USA, Inc., Bellevue, WA (US)

(72) Inventors: Homer Nicolas B. Filart, Renton, WA (US); Andrew Lee Watts, Seattle, WA (US); Jose R. Mendoza, Jr., Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/737,854

(22) Filed: Jan. 8, 2020

(65) Prior Publication Data

US 2020/0221302 A1    Jul. 9, 2020

Related U.S. Application Data

(60) Provisional application No. 62/789,969, filed on Jan. 8, 2019.

(51) Int. Cl.
*H04W 8/02*    (2009.01)
*H04L 29/06*    (2006.01)
(Continued)

(52) U.S. Cl.
CPC ....... *H04W 12/0609* (2019.01); *H04L 65/105* (2013.01); *H04L 65/1006* (2013.01);
(Continued)

(58) Field of Classification Search
CPC ......... H04W 12/0609; H04W 12/1008; H04W 8/02; H04W 48/02; H04W 84/042;
(Continued)

(56) References Cited

U.S. PATENT DOCUMENTS

| 2011/0047277 A1* | 2/2011 | Bakker | H04L 65/1016 |
| | | | 709/227 |
| 2016/0248814 A1* | 8/2016 | Mufti | H04L 67/327 |
| 2020/0028690 A1* | 1/2020 | Barakat | H04W 12/1008 |

OTHER PUBLICATIONS

Alliance for Telecom Industry Solutions, ATIS-0300116 (Year: 2018).*

(Continued)

*Primary Examiner* — William Nealon
(74) *Attorney, Agent, or Firm* — Han Santos, PLLC; Nabil A. Abdalla

(57) ABSTRACT

A Secure Telephony Identity (STI) proxy server is described for intercepting incoming Voice over Internet Protocol (VoIP) communication requests for the purpose of mitigating an effect of fraudulent and nuisance VoIP communications. The STI proxy server may facilitate an STI verification server in verifying an authenticity of an originating network associated with an incoming call request. In one example, the STI proxy server may verify that the visited network is permitted to interact with the home network, based on a list of permissible networks. In addition, the STI proxy server may determine whether public STI certificates associated with an originating network have expired or set to expire within a predetermined time interval. In response to an actual o impending expiration, the STI proxy server may facilitate retrieval of a superseding, new public STI certificate for use by an STI authentication server to digitally sign an outgoing SIP INVITE messages.

20 Claims, 8 Drawing Sheets

(51) Int. Cl.
  *H04M 3/42* (2006.01)
  *H04W 12/10* (2021.01)
  *H04W 84/04* (2009.01)
  *H04W 12/06* (2021.01)
  *H04W 48/02* (2009.01)

(52) U.S. Cl.
  CPC .... *H04L 65/1069* (2013.01); *H04M 3/42059* (2013.01); *H04W 8/02* (2013.01); *H04W 12/1008* (2019.01); *H04W 48/02* (2013.01); *H04W 84/042* (2013.01)

(58) Field of Classification Search
  CPC ............... H04L 65/1006; H04L 65/105; H04L 65/1069; H04M 3/42059
  USPC ........................................................ 455/411
  See application file for complete search history.

(56) References Cited

OTHER PUBLICATIONS

Alliance for Telecom Industry Solutions, ATIS-1000074-E (Year: 2019).*
Alliance for Telecom Industry Solutions, ATIS-1000080.v002 (Year: 2019).*
Internet Engineering Task Force (IETF), RFC-8224 (Year: 2018).*
Internet Engineering Task Force (IETF), RFC-8225 (Year: 2018).*
Internet Engineering Task Force (IETF), RFC-8226 (Year: 2018).*

* cited by examiner

SECURE TELEPHONE IDENTITY (STI) CERTIFICATE MANAGEMENT SYSTEM

RELATED APPLICATION

This application claims priority to a co-pending, commonly owned U.S. Provisional Patent Application No. 62/789,969, filed on Jan. 8, 2019, and titled "Secure Telephone Identity (STI) Certificate Management System," which is herein incorporated by reference in its entirety.

BACKGROUND

Today, the use of mobile devices is widespread. Continual advancements in mobile device technology can improve the productivity and quality of life for users by enhancing accessibility to real-time communications in a variety of environmental settings, such as a home, workplace, school, and/or so forth. However, mobile devices are highly susceptible to nuisance concerns by unspecified individuals that target some users for unwanted or ill-intentioned purposes. Unspecified individuals may include telephone marketers or spammers that initiate nuisance concerns. Unspecified individuals may also include individuals that impersonate a known person's identity (i.e. phone number) for fraudulent or nuisance purposes.

Telecommunication providers have deployed a set of technology standards intended to help mitigate the impact of nuisance concerns through the use of digital certificates that ensure that the calling telephone identity, is legitimate. Under these sets of technology standards, each telecommunication provider uses a trusted certificate authority source to verify the calling telephone identity. However, the integration of new technology standards can impose interoperability and interworking challenges, which at times may overwhelm and negatively impact the operation of telecommunication networks. Such challenges can be viewed most prominent when the telecommunication network is inundated with communications intended for fraudulent or nuisance purposes.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates a first computing environment for operation of the STI proxy server within a SIP network. FIG. 1B illustrates a second computing environment for operation of the STI proxy server within a non-SIP network. FIG. 1C illustrates a detailed view of the STI proxy server interaction within a SHAKEN framework of a SIP and a non-SIP network.

DETAILED DESCRIPTION

Figure 1A:
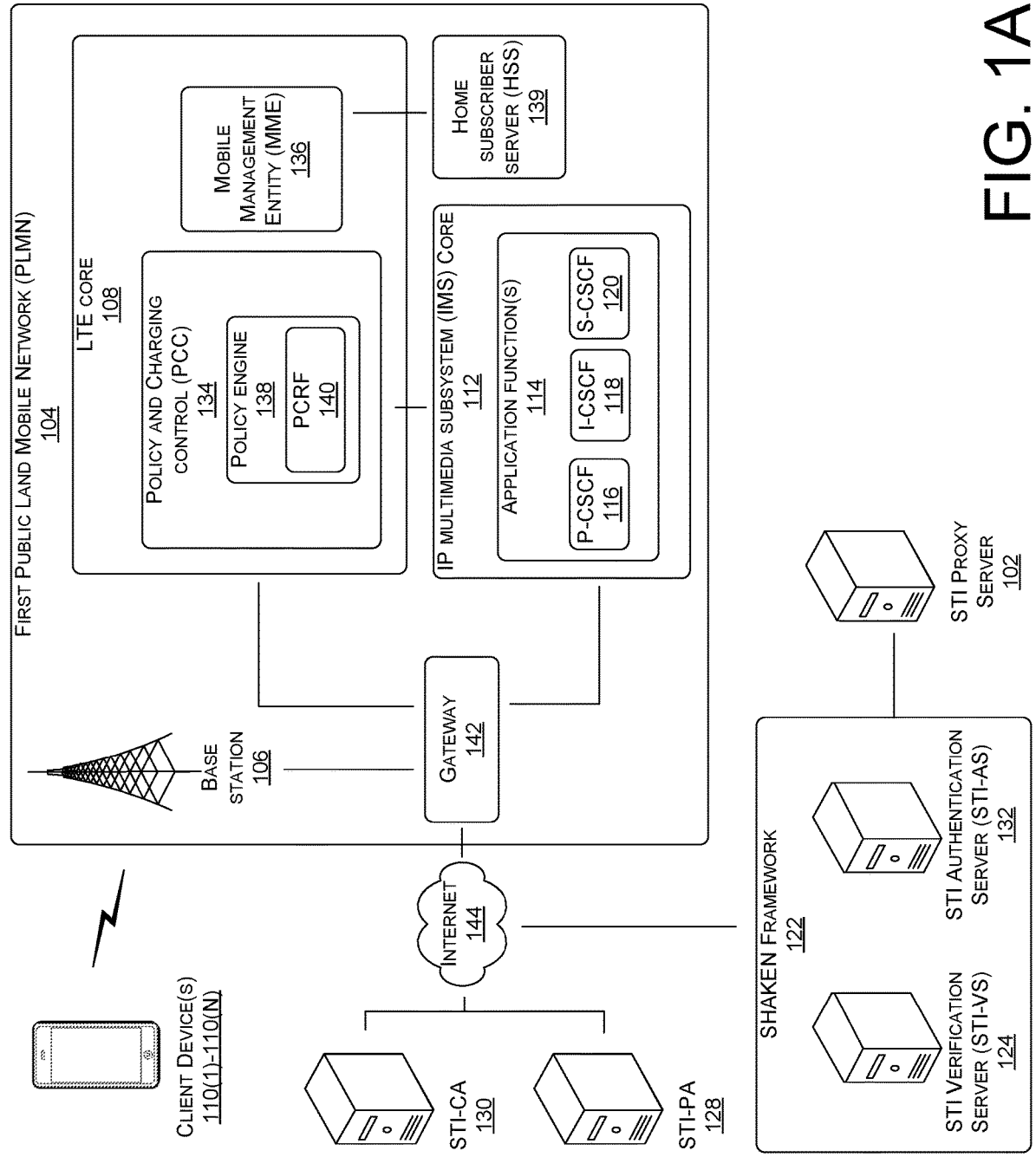
FIG. 1A through 1C illustrate schematic views of computing environments for the operation of the STI proxy server within a non-SIP network and a SIP network.

This disclosure describes techniques that facilitate authenticating outgoing call requests from a Public Land Mobile Network (PLMN) and verifying incoming call requests from another PLMN based on the use of a valid Secure Telephony Identity (STI) public certificate. More specifically, an STI proxy server is configured to monitor a validity of a public STI certificate for a PLMN, for use by an STI authentication server (STI-AS) of an originating PLMN, in authenticating outgoing Voice over Internet Protocol (VoIP) communication requests (i.e. Session Initiation Protocol (SI)P INVITE messages) to another, receiving PLMN. Additionally, the STI proxy server, at the receiving PLMN, may facilitate verifying that an originating PLMN of a SIP INVITE message is permitted to interact with the receiving PLMN, based on a list of permissible networks. Further, the STI proxy server, at the receiving PLMN, may facilitate an STI verification (STI-VS) server in verifying an authenticity of a public STI certificate associated with an originating PLMN. The term "originating PLMN" as used herein describes the PLMN from which a call request (i.e. SIP INVITE message) is initiated, and the term "receiving PLMN" as used herein describes the PLMN that receives a call request initiated by the originating PLMN.

The techniques described herein are configured to be implemented within the Signature-based Handling of Asserted information using toKENs (SHAKEN) framework. Specifically, the SHAKEN framework is targeted at telecommunication service providers delivering phone calls over Voice over Internet Protocol (VoIP) and providing an end-to-end architecture for the authentication and assertion of a telephone identity by an originating service provider and the verification of the telephone identity by a terminating service provider.

The STI proxy server is configured to interface between a PLMN and the SHAKEN framework, and to limit a PLMN's exposure to volumes of fraudulent or nuisance incoming SIP INVITE messages. The STI proxy server may ensure that outgoing SIP INVITE messages from an originating PLMN incorporate a valid public STI certificate of the originating PLMN, for use by the receiving PLMN in verifying an identity of the originating PLMN. Additionally, the STI proxy server, at a receiving PLMN, may use a valid public STI certificate of the originating PLMN to intercept fraudulent or nuisance communications (i.e. list of permissible networks) close to the edge of the receiving PLMN, alleviating the prospect of such communications overwhelming network resources of the receiving PLMN (i.e. a denial-of-service attack).

The term "STI Certificate," as used herein, describes a public key certificate used by a service provider to sign and verify a Personal Assertion Token (PASSporT). The PASSporT may correspond to a token that includes information attesting to a Service Provider's knowledge of specific telephone identities that the terminating service provider can use to determine specific handling for voice communication.

The term "SIP INVITE message" corresponds to a call request configured to initiate a dialog for establishing a voice communication, such as a VoIP communication, between at least a pair of client devices. The SIP INVITE message may include a SIP identity header which conveys the proven identity of the originator of the SIP INVITE message. The SIP identity header has meaning within a trusted network framework by mutual agreement on the requirements for its use by the telecommunication network involved. The trusted network framework may correspond to the SHAKEN framework described earlier with reference to providing an end-to-end architecture for authentication and assertion of a telephone identity.

Further, the term "techniques," as used herein, may refer to system(s), method(s), computer-readable instruction(s), module(s), algorithms, hardware logic, and/or operation(s) as permitted by the context described above and through the document.

Figure 1B:
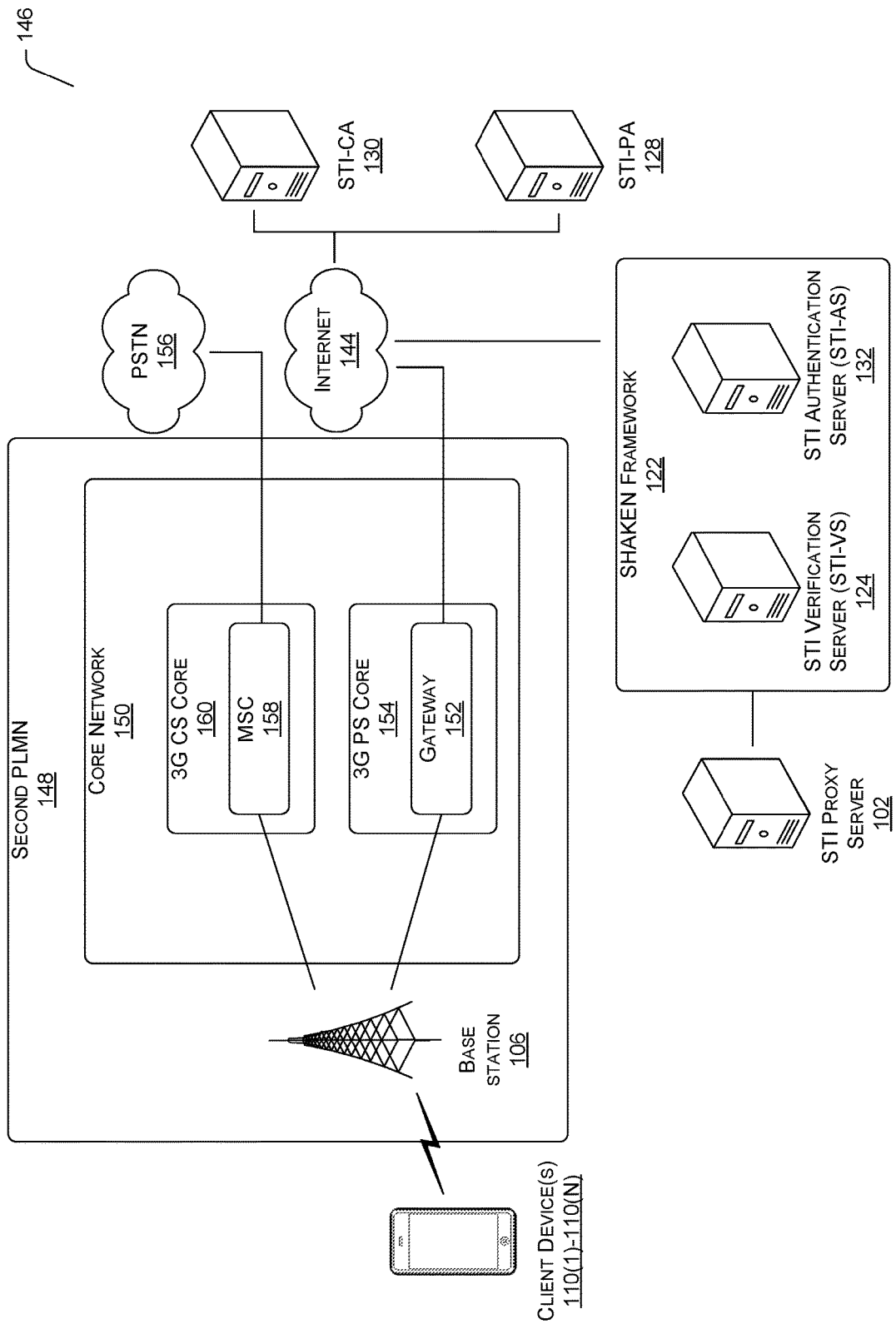
Figure 1C:
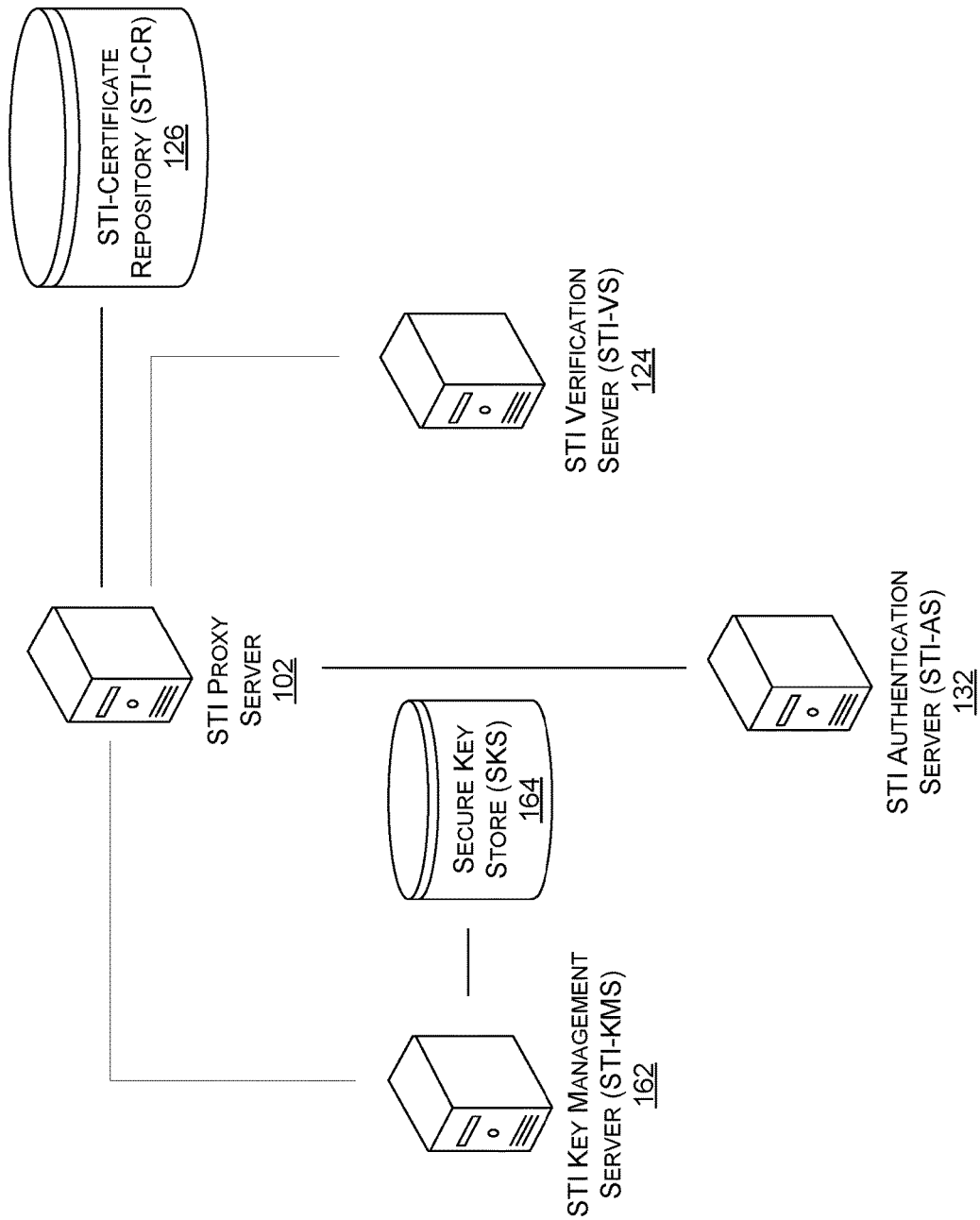

FIG. 1A through 1C illustrate schematic views of computing environments for the operation of the STI proxy server within a non-SIP network and a SIP network.

FIG. 1A illustrates a schematic view of a first computing environment 100 that facilitates the operation of the STI proxy server 102 within a first Public Land Mobile Network (first PLMN) 104. In FIG. 1A, the first PLMN 104 corresponds to a SIP network, such as a Long-Term Evolution (LTE) network. The first computing environment 100 may include base station node(s) 106 and an LTE core 108. The base station node(s) 106 are responsible for handling voice and data traffic via air interfaces between the LTE core 108 and LTE-compatible client devices, collectively referred to as client device(s) 110(1)-110(N). The LTE core 108 may provide telecommunication and data communication services to the client device(s) 110(1)-110(N).

The client device(s) 110(1)-110(N) may include any sort of electronic device, such as a cellular phone, a smartphone, a tablet computer, an electronic reader, a media player, a gaming device, a personal computer (PC), a laptop computer, etc. The client device(s) 110(1)-110(N) may include a subscriber identity module (SIM), such as an eSIM, to identify the client device(s) 110(1)-110(N) to a telecommunication service provider network (also referred to herein, as "telecommunication network").

In various examples, an IP Multimedia Subsystem (IMS) core 112 may reside within the first PLMN 104. The IMS core 112 may include application function(s) (AF) 114, such as a Proxy Call Session Control Function (P-CSCF) 116, an Interrogating Call Session Control Function (I-CSCF) 118, and a Serving Call Session Control Function (S-CSCF) 120, and the STI proxy server 102. The P-CSCF 116 behaves like a proxy by accepting requests and serving them internally or forwarding them towards to the I-CSCF 118 and S-CSCF 120. The S-CSCF 120 acts as a Session Initiation Protocol (SIP) registrar and in some cases as a SIP redirect server. The S-CSCF 120 is responsible for processing the location registration of a client device, client authentication, and call routing and processing. The I-CSCF 118 is tasked with selecting an S-CSCF 120 for serving an initial SIP request, particularly when a client device initiating the request does not know which S-CSCF 120 should receive the request.

The STI proxy server 102 may be part of a SHAKEN framework 122 that resides within the IMS core 112. The SHAKEN framework 122, described in further detail with reference to FIG. 1C is configured to establish end-to-end architecture that allows the first PLMN 104 to authenticate and assert a telephone identity (i.e. an identifier associated with an originator of a voice communication) and provide such verification to a receiving PLMN.

The STI proxy server 102 may intercept an incoming SIP INVITE message that is received at an I-CSCF 118 or S-CSCF 120 of the IMS core 112. In other examples, the STI proxy server 102 may intercept the SIP INVITE message at the P-CSCF 116, which is closer to the end of the first PLMN 104. A benefit of doing so is to limit exposure of the first PLMN 104 (i.e. receiving PLMN) to volumes of fraudulent or nuisance SIP INVITE messages.

In response to intercepting the SIP INVITE message, the STI proxy server 102 may verify that the originating PLMN is permitted to interact with the first PLMN 104 (i.e. receiving PLMN) based on a list of permissible networks. Further, the STI proxy server 102 may retrieve a public STI certificate of the originating PLMN. The public STI certificate may, in part, facilitate verifying an identity of the originating PLMN, at an STI-VS 124 of the SHAKEN framework 122. The STI proxy server 102 may retrieve the public STI certificate of the originating PLMN from a peer-Certificate Repository (CR) that resides at the originating PLMN. In response to the STI proxy server 102 verifying the identity of the originating PLMN, the STI proxy server 102 may re-direct SIP INVITE message to the point at which it was intercepted within the IMS core 112.

In another example, the STI proxy server 102 may determine whether a public STI certificate of a first PLMN 104, acting as the originating PLMN of a SIP INVITE message, has expired or is set to expire within a predetermined time interval. In the event that public STI certificate has expired, the STI proxy server 102 may interact with an STI Policy Administrator (STI-PA) 128 and an STI Certificate Authority (STI-CA) 130, external to the first PLMN 104, to obtain a new, public STI certificate.

The STI-PA 128 may serve in a policy enforcement role and may be entrusted to confirm that the first PLMN 104 is authorized to request the public STI certificate from an STI-CA 130 and authorize the STI-CA 130 to issue the public STI certificate. The STI-CA 130 may serve to provide the public STI certificates that are used to digitally sign and verify the outgoing SIP INVITE messages. In alternate embodiments, the first PLMN 104 may establish an in-network STI-CA.

The public STI certificate may facilitate, in part, modifying the outgoing SIP INVITE message to include an attestation of the first PLMN 104 identity at an STI-AS 132 of the SHAKEN framework 122. In response to providing authentication of the first PLMN 104 identity in the outgoing SIP INVITE message, the STI proxy server 102 may be further configured to re-direct an intercepted SIP INVITE message to the point at which it was intercepted within the IMS core 112.

Additionally, the LTE core 108 may further include a Policy and Charging Control (PCC) 134 and a Mobile Management Entity (MME) 136. The PCC 134 may enable detection of communication service data flow and provide parameters for policy control and/or charging control. In the illustrated example, the PCC 134 may include a policy engine 138, such as a Policy and Charging Rules Function (PCRF) 140. The MME 136 performs signal functions in the LTE core 108. The MME 136 and send and receive signaling information needed to set up bill, and address calls to the base station node(s) 106 and contains security protocols for authentication and authorization. The MME 136 may access the HSS 139 that is configured to authenticate an identity of a client and authorize operation of a corresponding client device on the first PLMN 104.

Further, a gateway 142 may interface with the IMS core 112 and the LTE core 108. The gateway 142 may include one or more servers and related components that are tasked with providing connectivity between the IMS core 112, the LTE core 108, the client device(s) 110(1)-110(N), and the internet 144. More specifically, the gateway 142 may act as a point of entry and exit for network traffic into the first PLMN 104. The STI proxy server 102 and the SHAKEN framework 122 (i.e. STI-VS 124 and STI-AS 132 inclusive), communicate with the IMS core 112 via the internet 144.

The STI proxy server 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices via one or more network(s). The one or more network(s) may include public networks such as the Internet, private networks such as an institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, LTE, 5G NR-LTE, and so forth), or any combination thereof.

While this disclosure describes the STI proxy server 102 and the SHAKEN framework 122 as being remotely executable on separate servers or separate devices that are external to the IMS core 112, further variations and modifications can be made such that the STI proxy server 102 and SHAKEN framework 122 are within the IMS core 112. One of ordinary skill in the art would appreciate that such an embodiment remains within the scope of the invention, as defined in the appended claims.

FIG. 1B illustrates a second computing environment 146 for the operation of the STI proxy server within a non-SIP network, such as the second PLMN 148. The second computing environment 146 described in FIG. 1B includes various details relating to the STI proxy server 102 that were previously described with reference to FIG. 1A. As such, for brevity and ease of description, various details relating to the STI proxy server 102 have been omitted herein to the extent that the same or similar details have been provided in relation to the first computing environment of FIG. 1A.

Referring to FIG. 1B, the second PLMN 148 may include a core network 150, which may further include 3G domain components that support 3G data traffic and 3G voice traffic. For example, 3G data traffic between a 3G-compatible, client device(s) 110(1)-110(N), and the internet 144 may be routed through one or more gateway(s) 152 of a 3G Packet Switch (PS) Core 154. Additionally, 3G voice traffic between the 3G-compatible, client device(s) 110(1)-110(N), and the Public Switched Telephone Network (PSTN) 156 may be routed through a Mobile Switch Center (MSC) 158 of the 3G Circuit Switch (CS) core 160. The MSC 158 is configured to control the network switching subsystem of the second PLMN 148. The network switching subsystem carries out call out and mobility management functions for client device(s) 110(1)-110(N).

In this example, the STI proxy server 102 and SHAKEN framework 122 may communicate with the core network 150 via the internet 144, from which call requests may be intercepted and re-directed via the STI proxy server 102, as described earlier with reference to FIG. 1A. While this disclosure describes the STI proxy server 102 and the SHAKEN framework 122 as being remotely executable on separate servers or separate devices that are external to the core network 150, further variations and modifications can be made such that the STI proxy server 102 and SHAKEN framework 122 are within the core network 150. One of ordinary skill in the art would appreciate that such an embodiment remains within the scope of the invention, as defined in the appended claims.

FIG. 1C illustrates a detailed view of the STI proxy server 102 interaction within a SHAKEN framework 122 of a SIP and a non-SIP network. In the illustrated example, the STI proxy server 102 is communicatively coupled to an STI-CR 126, an STI Key Management Server (STI-KMS) 162, an STI Verification Server (STI-VS) 124, and an STI authentication server (STI-AS) 132. The STI-CR 126 may correspond to an HTTPS server that hosts the public STI certificates used by other PLMNs to validate a digital signature of a PLMN that initiates a VoIP communication by transmitting a SIP INVITE message to the receiving PLMN.

The STI-KMS 162 may correspond to a server that generates asymmetric key pairs that comprise of a public key and a counterpart private key. The public key may be used to request a public STI certificate from the STI-CA 130. The counterpart private key may be used to digitally sign an outgoing SIP INVITE message for digitally signing outgoing SIP INVITE message as a mechanism to attest to an originating PLMN identity to a receiving PLMN.

Moreover, the STI-KMS 162 may be communicatively coupled to a Secure Key Store (SKS) 164. The SKS 164 may correspond to a repository for private keys used by the originating PLMN to digitally sign outgoing SIP INVITE messages.

The STI-AS 132 may correspond to a server that is configured to provide an attestation of an originating PLMN identity in an outgoing SIP INVITE message. More specifically, the STI-AS 132 may be configured to use the private key sourced from the STI-KMS 162 to insert a Personal Assertion Token (PASSporT) within a SIP identity header of the outgoing SIP INVITE message.

The STI-VS 124 may correspond to a server that is configured to verify an identity of an originating PLMN that is associated with an incoming SIP INVITE message. More specifically, the STI-VS 124 may use the public STI certificate sourced from the STI-CR (i.e. alternatively, from an STI-CA 130), to validate the PASSporT within the SIP identity header of the incoming SIP INVITE message from the originating PLMN. In this way, the STI-VS 124 may validate the origin of the incoming SIP INVITE message.

Figure 2:
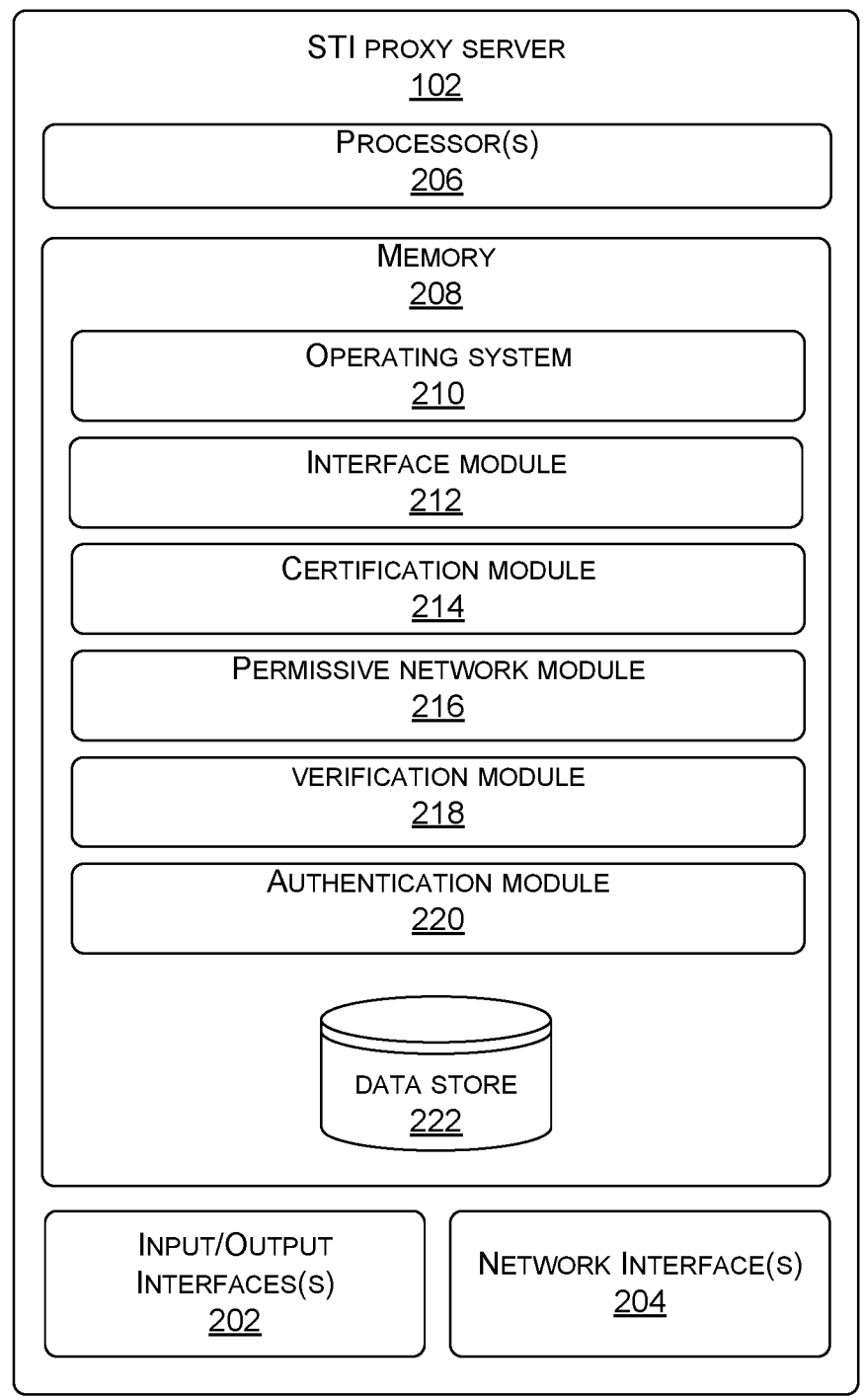
FIG. 2 illustrates a block diagram of various components of the STI proxy server.

FIG. 2 illustrates a block diagram of various components of the STI proxy server 102. In one example, the STI proxy server 102 may be associated with an originating PLMN that transmits an outgoing SIP INVITE message to a receiving PLMN to initiate a VoIP communication. In another example, the STI proxy server 102 may be associated with a receiving PLMN that receives an incoming SIP INVITE message from an originating PLMN to initiate a VoIP communication.

The STI proxy server 102 may include input/output interface(s) 202. The input/output interface(s) 202 may include any type of output interface known in the art, such as a display (e.g. a liquid crystal display), speakers, a vibrating mechanism, or a tactile feedback mechanism. Input/output interface(s) 202 also include ports for one or more peripheral devices, such as headphones, peripheral speakers, or a peripheral display. Further, the input/output interface(s) 202 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the STI proxy server 102 may include network interface(s) 204. The network interface(s) 204 may include any sort of transceiver known in the art. For example, the network interface(s) 204 may include a radio transceiver that performs the function of transmitting and receiving radio frequency communications via an antenna. In addition, the network interface(s) 204 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 204 may include wired communication components, such as an Ethernet port or a Universal Serial Bus (USB).

Further, the STI proxy server 102 may include one or more processor(s) 206 that are operably connected to memory 208. In at least one example, the one or more processor(s) 206 may be a central processing unit(s) (CPU), graphics processing unit(s) (GPU), or both a CPU and GPU or any other sort of processing unit(s). Each of the one or more processor(s) 206 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 206 may also be responsible for executing all computer applications stored in the memory, which can be associated with common types of volatile (RAM) and/or non-volatile (ROM) memory.

In some examples, memory 208 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 208 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 208 may include an operating system 210, an interface module 212, a certification module 214, a permissive network module 216, a verification module 218, an authentication module 220, and a data store 222. The operating system 210 may be any operating system capable of managing computer hardware and software resources. The operating system 210 may include an interface layer that enables applications to interface with the input/output interface(s) 202 and the network interface(s) 204.

The interface module 212 may be configured to monitor and intercept an outgoing SIP INVITE message from within the IMS core of an originating PLMN, and an incoming SIP INVITE message from within the IMS core of a receiving PLMN. In each example, the interface module 212 may be configured to intercept SIP INVITE messages at the I-CSCF or C-CSCF of the IMS core. Further, in response to an indication from a verification module 218 or authentication module 220, the interface module 212 may re-direct an intercepted SIP INVITE message to the point at which it was intercepted within the IMS core.

The certification module 214 may be configured to retrieve a public STI certificate of an originating PLMN that is associated with an outgoing SIP INVITE message. The public STI certificate may be used by an originating PLMN to verify their identity in an outgoing SIP INVITE message to a receiving PLMN. In this example, the certification module 214 may interact with an STI-PA to retrieve a token that may be used to retrieve a public STI certificate from an STI-CA. In this example, the certification module 214 may first interact with an STI-KMS to retrieve an asymmetric key pair, which comprises a public key and a private key. In doing so, the public key may be sent to the STI-PA to retrieve a token that is sent to a selected STI-CA. In return, the certification module 214 may receive a public STI certificate from the selected STI-CA. The certification module 214 may maintain a list of STI-CAs that may be used to retrieve a public STI certificate. Further certification module 214 may select an STI-CA from the list of STI-CAs based on a developed trust relationship between the selected STI-CA and the receiving PLMN of the outgoing SIP INVITE message. Alternatively, the STI-PA, with whom the certification module 214 interacts to receive a token, may select an STI-CA from the list of STI-CAs for the outgoing SIP INVITE message, based on the identity of the receiving PLMN.

Upon receipt of the Public STI certificate, the certification module 214 may store the public STI certificate within an STI-CR of the originating network.

Alternatively, rather than transmitting the public key to the STI-PA, the certification module 214 may select the STI-CA from the list of STI-CAs maintained within the data store 222 of the STI proxy server 102, and in doing so, transmit the public key directly to the selected STI-CA to retrieve the public STI certificate.

Moreover, the certification module 214 may retrieve a public STI certificate of an originating PLMN that is associated with an incoming SIP INVITE message. The certification module 214 may interrogate an STI-CR to determine whether a public STI certificate associated with the originating PLMN is stored therein. In response to determining that a public STI certificate associated with the originating PLMN is available within the STI-CR, the certification module 214 may retrieve and transmit the public STI certificate to the verification module 218 for use in verifying an identity of the originating PLMN.

In another example, the certification module 214 may determine that the public STI certificate associated with the originating PLMN is not available in the STI-CR. In this example, the certification module 214 may interact with a peer-CR of the originating PLMN to retrieve the public STI certificate. In this example also, the certification module 214 may retrieve the public STI certificate from the peer-CR, transmit the public STI certificate to the verification module 218 for use in verifying an identity of the originating PLMN, and store the public STI certificate within the STI-CR.

The permissive network module 216 may be configured to determine whether an originating PLMN that transmits an incoming SIP INVITE message to a receiving PLMN associated with the STI proxy server 102 is permitted to interact with the receiving PLMN. In this example, the permissive network module 216 may maintain a list of permissible networks with whom the receiving PLMN is permitted to interact. The list of permissible networks may be stored within the data store 222 and maintained in real-time based on trust statuses captured from affiliated STI-Pas and STI-CAs of the originating and receiving PLMNs.

In one example, the permissive network module 216 may parse through a SIP header of an incoming SIP INVITE message and capture a network identifier associated with the originating network. In doing so, the network identifier may be compared with data entries within the list of permissible networks. In the event that the network identifier is not included within the list of permissible networks, the permissive network module 216 may perform acts to reject establishing a VoIP communication with the originating PLMN. In one example, the permissive network module 216 may end the process of verifying the SIP INVITE message and choose not to re-direct the SIP INVITE message to the point at which it was intercepted within the IMS core, such as the S-CSCF. In doing so, the call request associated with the SIP INVITE message will timeout and fail to establish a VoIP communication.

In contrast, in response to determining that the network identifier is included within the list of permissible networks, the permissive network module 216 may transmit an indication of the same to the verification module 218 for further verification of an identity of the originating PLMN.

The verification module 218 may be configured to receive, from the permissive network module 216, an indication that an originating PLMN is included within the list of permissible networks. In doing so, the verification module 218 may further receive, from the certification module 214, a public STI certificate associated with an originating PLMN of an incoming SIP INVITE message. In this example, the verification module 218 may use the public STI certificate to validate an origin of the SIP INVITE message by pairing the public STI certificate with the private key used to digitally sign the SIP identity header of the SIP INVITE message. Recall that the private key used to digitally sign the SIP identity header is a counterpart to the public key used to generate the public STI certificate. Thus, by pairing the public STI certificate with the SIP identity header, the verification module 218 may verify the origin of the SIP INVITE message as originating PLMN.

Upon verification of the originating PLMN identity, the verification module 218 may transmit an indication of the same to the interface module 212, which is further configured to re-direct the SIP INVITE message to the point at which it was intercepted within the IMS core of the receiving PLMN.

In contrast, if the verification module 218 is unable to verify an identity of the originating PLMN, the verification module 218 may end the process of verifying the SIP INVITE message and choose not to re-direct the SIP INVITE message to the point at which it was intercepted within the IMS core, such as the S-CSCF. In doing so, the call request associated with the SIP INVITE message will timeout and fail to establish a VoIP communication.

The authentication module 220 may be configured to facilitate an STI-AS in providing attestation of an originating PLMN in an outgoing SIP INVITE message. In this example, the authentication module 220 may determine whether a public STI certificate for the originating PLMN has expired or is set to expire within a predetermined time interval. The predetermined time interval may be one day, one week, or thirty days. Any time interval is possible. In some examples, the predetermined time interval may be set by an operator or administrator of the STI proxy server 102 or the originating PLMN. In the event that the public STI certificate has expired or is set to expire, the authentication module 220 may interact with the certification module 214 to retrieve a new public STI certificate from an STI-CA. In this instance, the new public STI certificate acts to supersede and replace the expired or set to expire public STI certificate. In response to the certification module 214 retrieving a new public STI certificate and storing the new public STI certificate within the STI-CR, the authentication module 220 may subsequently retrieve the new public STI certificate from the STI-CR as part of validating outgoing SIP INVITE messages.

The authentication module 220 may further retrieve, from an SKS of an STI-KMS, a private key that is a counterpart to the public key associated with the new public STI certificate, and transmit an indication to the STI-AS that the new public STI certificate of the originating PLMN is stored with the STI-CR. In this example, the private key may be used by the STI-AS to digitally sign the outgoing SIP INVITE messages.

The data store 222 may include various data relating to an operation of the STI proxy server, including at least the list of permissible networks and a list of STI-CAs.

Figure 3:
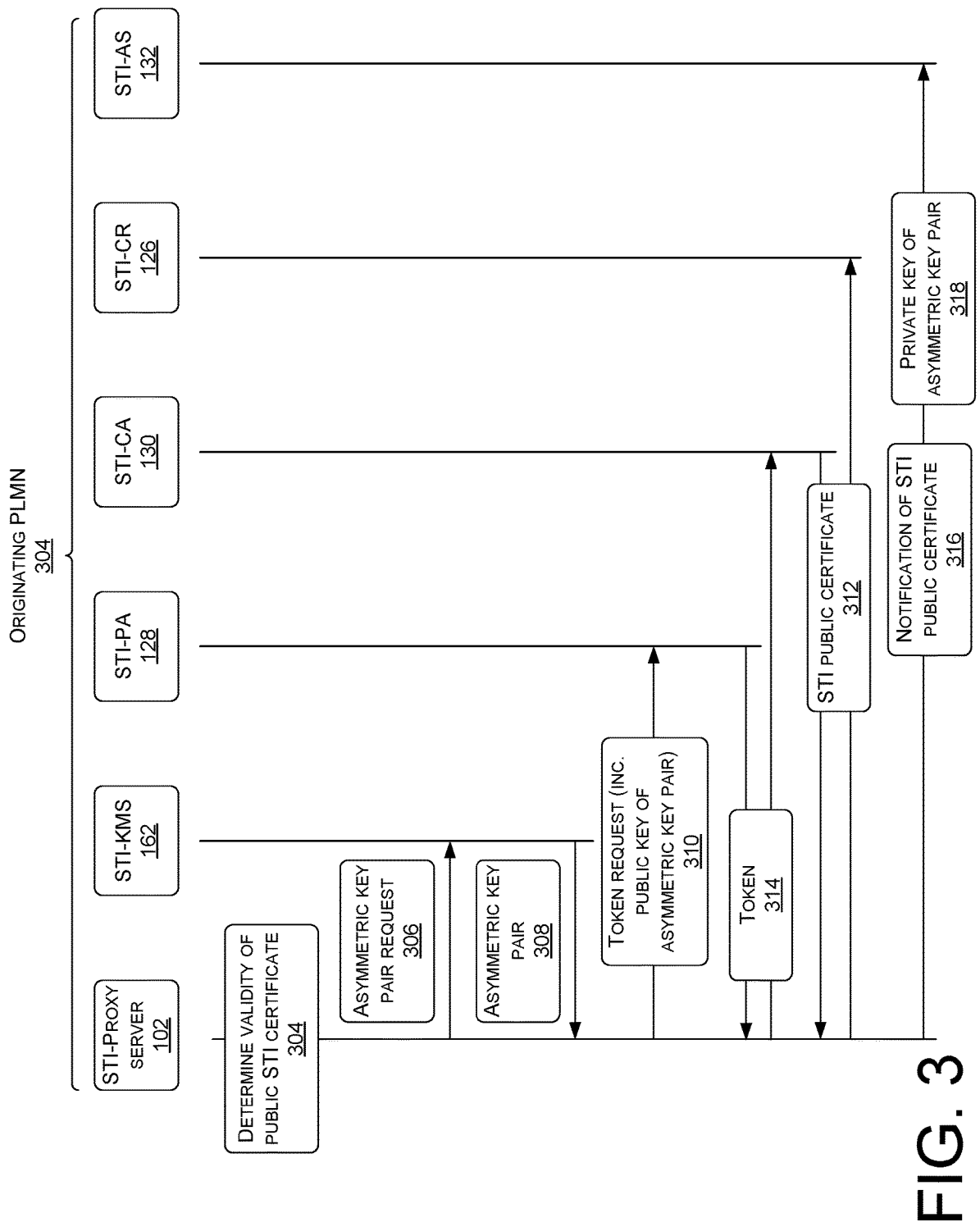
FIG. 3 illustrates a block diagram of a process for the STI proxy server to interact with an STI-PA and STI-CA to facilitate an STI-AS in providing attestation of the PLMN identity in an outgoing SIP INVITE message.

FIG. 3 illustrates a block diagram of a process of interacting with an STI-PA 128 and STI-CA 130 to facilitate an STI-AS 132 in providing attestation of the PLMN identity in an outgoing SIP INVITE message. The illustrated example is presented from the perspective of an STI proxy server 102 that is associated with an originating PLMN 302 that generates an outgoing SIP INVITE message.

In the illustrated example, the STI-proxy server 102 may retrieve a current public STI certificate from the STI-CR and, at block 304, determine whether the public STI certificate associated with the originating PLMN 302 has expired or is set to expire within a predetermined time interval. In the event that the public STI certificate has expired or is to set to expire, the STI proxy server 102 may perform acts to retrieve a new, valid public STI certificate. Specifically, the STI proxy server 102 may transmit an asymmetric key pair request 306 to an STI-KMS 162. The asymmetric key pair 308 may comprise a public key that is to be used to generate a public STI certificate and a counterpart private key that is to be used digitally sign an outgoing SIP INVITE message. In this example, the public STI certificate is made available to the receiving PLMN via a trusted STI-CA or the STI-CR of the originating PLMN. Doing so allows the receiving PLMN to authenticate the digitally signed SIP identity header of the outgoing SIP INVITE message since the private key used to digitally sign the SIP identity header is the counterpart to the public key associated with the public STI certificate.

The STI proxy server 102 may receive the asymmetric key pair 308 from the STI-KMS 162. In doing so, the STI proxy server 102 may generate a token request 310 that is intended for an STI-PA 128. The STI-PA 128 may be entrusted to confirm that the originating PLMN 302 is authorized to request a public STI certificate 312 from an STI-CA 130, and further authorize an STI-CA 130 to issue the public STI certificate. In this example, the token request 310 may include the public key of the asymmetric key pair 308 that was retrieved from the STI-KMS 162.

The STI proxy server 102 may receive a token 314 from the STI-PA 128 along with an indication of an STI-CA 130 that is authorized to issue the public STI certificate 312. In some examples, the identity of the STI-CA 130 may be dependent on the identity of the receiving PLMN. For example, the STI-CA 130 may be selected on the basis that the receiving PLMN has developed a trust relationship with the STI-CA 130. This is particularly relevant since the intent of the public STI certificate 312 is to provide the originating PLMN 302 with a mechanism to attest its identity to the receiving PLMN. Thus, provisioning a public STI certificate 312 from a trusted source of the receiving PLMN, namely the selected ST-CA 130, permits the originating PLMN 302 to provide the receiving PLMN with a trusted identity attestation.

Further, the STI proxy server 102 may transmit the token 314 received from the STI-PA 128 to the selected STI-CA 130. It is noteworthy that the token 314 sent to the STI-CA 130 may be configured to include the public key of the asymmetric key pair 308 that was originally received from the STI-KMS 162 and further sent to the STI-PA 128. Alternatively, the STI proxy server 102 may transmit the public key with the token 314 to the selected STI-CA 130.

Upon receipt of the token 314, the STI-CA 130 may transmit the public STI certificate 312 to the STI proxy server 102. The STI proxy server 102 may store the public STI certificate 312 within an STI-CR 126 for later use in the event that an incoming call request is received from the receiving PLMN. This process is described in further detail with reference to FIG. 4.

Moreover, the STI proxy server 102 may transmit a notification 316 to the STI-AS 132 that the public STI certificate 312 is stored within the STI-CR 126. The STI proxy server 102 may further transmit the private key 318 of the asymmetric key pair 308 that is a counterpart to the public key associated with the public STI certificate 312. In this way, the STI-AS 132 may use the private key to digitally sign a PASSporT within the SIP identity header of the outgoing SIP INVITE message.

Once the outgoing SIP INVITE message has been digitally signed, the STI proxy server 102 may pull the outgoing SIP INVITE message from the STI-AS 132 and further transmit the outgoing SIP INVITE message to the point at which it was intercepted by the STI proxy server 102 within the IMS core, such as the S-CSCF 120.

Figure 4:
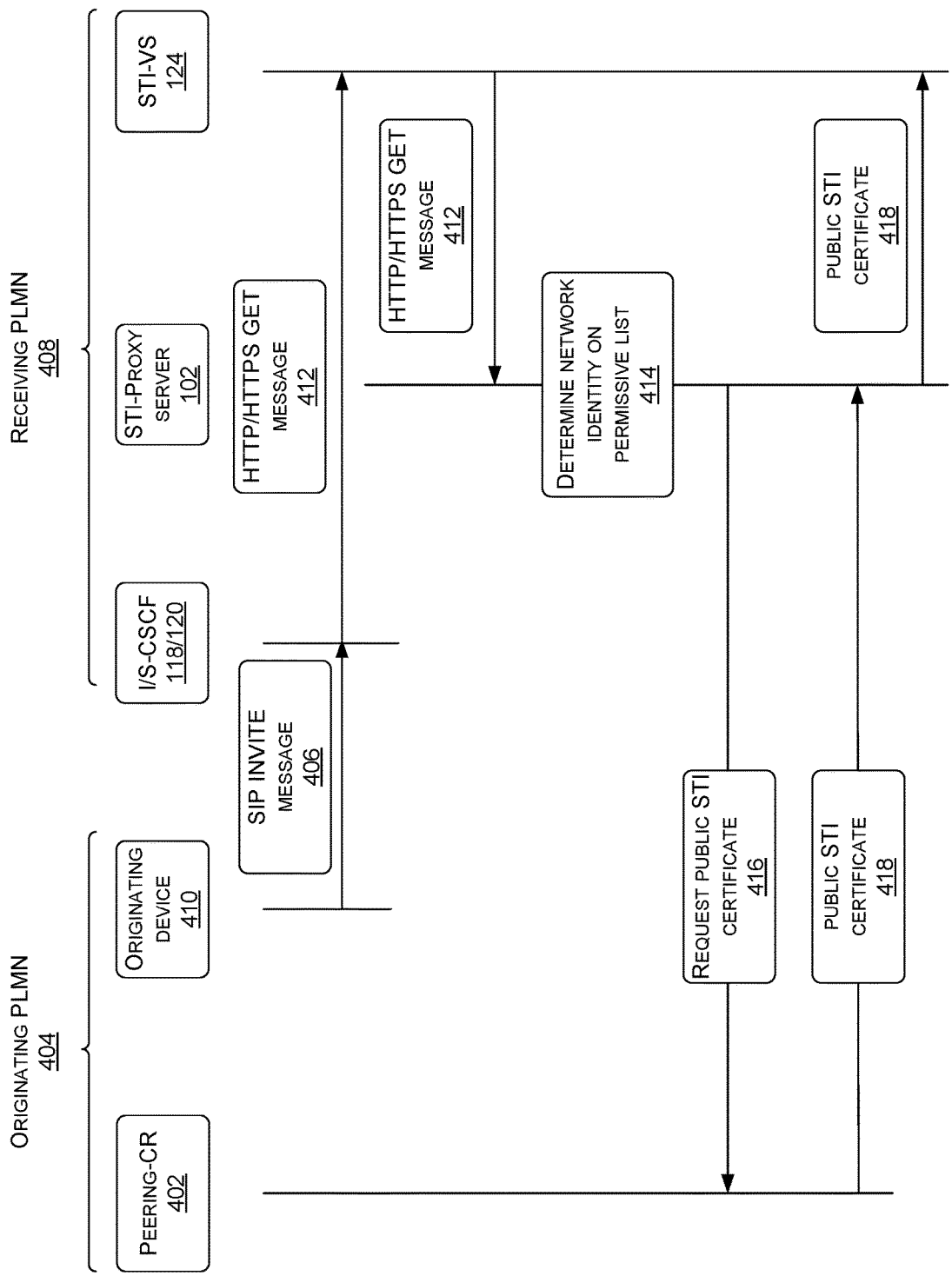
FIG. 4 illustrates a block diagram of a process for the STI proxy server to selectively interact with a peering certificate repository to facilitate an STI-VS in verifying an identity of an originating PLMN associated with an incoming SIP INVITE message.

FIG. 4 illustrates a block diagram of a process for the STI proxy server 102 to selectively interact with a peering certificate repository (peer-CR) 402 to facilitate an STI-VS 124 in verifying an identity of an originating PLMN 404 associated with an incoming SIP INVITE message 406. The illustrated example is presented from the perspective of an STI proxy server 102 that is associated with a receiving PLMN 408 that receives an incoming SIP INVITE message 406.

In the illustrated example, the receiving PLMN 408 may receive an incoming SIP INVITE message 406 from an originating device 410 (i.e. one of the client device(s) 110(1)-110(N)) of the originating PLMN 404. The receiving PLMN 408 may receive the incoming SIP INVITE message 406 at the S-CSCF 120, via the P-CSCF 116 and I-CSCF 118. Typically, the SIP INVITE message 406 is transmitted from the S-CSCF 120 to the STI-VS 124. The STI-VS 124 may verify an identity of the originating PLMN 404, and in doing so, separate out legitimate communications from those intended for fraudulent or nuisance purposes. Fraudulent or nuisance communications identified by the STI proxy server 102 may be rejected, thus alleviating the prospect of such communications overwhelming network resources of the receiving PLMN 408.

In this instance, the STI proxy server 102 may intercept the incoming SIP INVITE message 406 between the S-CSCF 120 and the STI-VS 124, or at the STI-VS 124. At the STI-VS 124, the STI proxy server 102 may receive a Hyper Text Transfer Protocol (HTTP)/HTTP Secure (HTTPS) GET or POST message 412 from the STI-VS 124. The HTTP/HTTPS GET or POST message is intended to request information from a server. In this example, the HTTP/HTTPS GET or POST message is associated with the incoming SIP INVITE message 406, and is used by the STI proxy server 102 to initiate retrieval of a public STI certificate from the peer Certificate Repository (CR) 402.

Alternatively, the STI proxy server 102 may receive the HTTP/HTTPS GET or POST message 412 from the S-CSCF 120. In another example, the STI proxy server 102 may receive intercept the SIP INVITE message 406. Upon receipt of the HTTP/HTTPS GET or POST message 412 (or SIP INVITE message 406 for that matter), the STI proxy server 102 may parse through the HTTP/HTTPS GET or POST message 412 (or SIP INVITE message 406) to infer an identity of the originating PLMN 404. In some examples, the SIP identity header may include a network identifier associated with the originating PLMN 404.

Further, the STI proxy server 102 may compare the network identifier of the originating PLMN 404 with data entries within a list of permissible networks that the receiving PLMN 408 is permitted to interact. The list of permissible networks may be maintained in real-time by the STI proxy server 102 and may be configured to include a trust status along with affiliated STI-PAs and STI-CAs of the originating PLMN 404.

In one example, the STI proxy server 102 may determine that the network identifier of the originating PLMN 404 is not included within the list of permissible networks. In this example, the STI proxy server 102 may perform acts intended to reject establishing a VoIP communication associated with the incoming SIP INVITE message 406. The STI proxy server 102 may fail to re-direct the incoming SIP INVITE message 406 to the point at which it was intercepted within the IMS core, such as the S-CSCF 120 or the STI-VS 124. In doing so, the call request associated with the incoming SIP INVITE message 406 will timeout and fail to establish a VoIP communication.

The STI proxy server 102 may determine that the network identifier of the originating PLMN 404 is included within the list of permissible networks 414. In this latter example, the STI proxy server 102 may transmit a request for the public STI certificate 416 to the peer-CR 402 of the originating PLMN 404.

Upon receipt of the public STI certificate 418, the STI proxy server 102 may transmit the public STI certificate 418 to the STI-VS 124. The STI-VS 124 may use the public STI certificate 418 to validate the PASSporT within the SIP identity header of the incoming SIP INVITE message 406. In this way, the STI-VS 124 may validate the origin of the call request. Recall that the PASSporT is digitally signed using a private key of an asymmetric key pair associated with the originating PLMN 404 that is a counterpart to the public key associated with the public STI certificate 418.

In response to verifying an identity of the originating PLMN 404, the STI-VS 124 may transmit a verification indication 420 to the STI proxy server 102, at which time the STI proxy server 102 may re-direct the incoming SIP INVITE message 406 to the point at which it was intercepted within the IMS core, such as the S-CSCF 120 or the STI-VS 124. In the event that the STI-VS 124 does not verify an identity of the originating PLMN 404, the STI-VS 124 may choose not to re-direct the incoming SIP INVITE message 406 to the S-CSCF 120, which in turn may cause the incoming SIP INVITE message 406 to timeout and fail to establish a VoIP communication.

Figure 5:
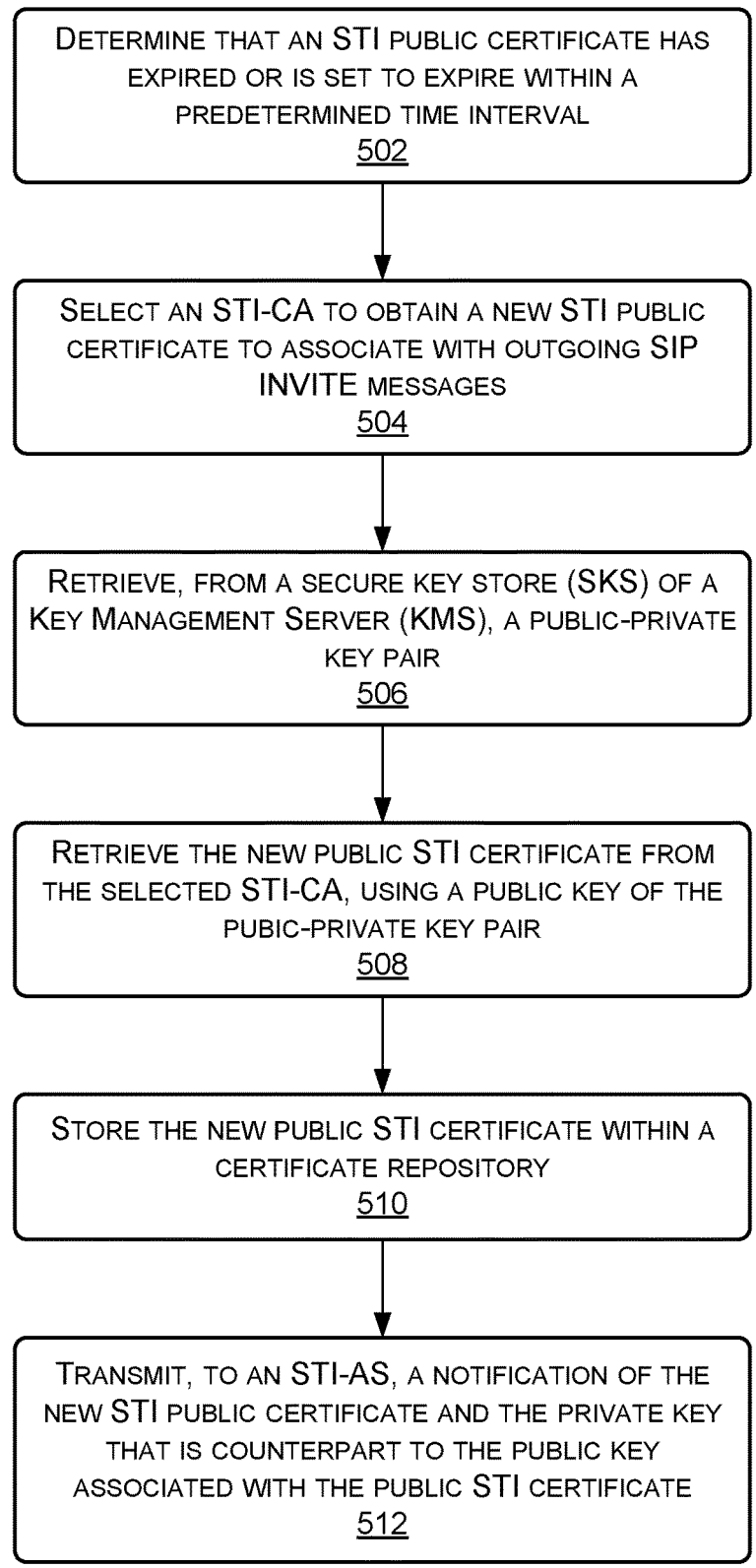
FIG. 5 illustrates a process for detecting a call request initiated within a PLMN and facilitating an STI-AS in providing attestation of the PLMN identity in an outgoing SIP INVITE message.
Figure 6:
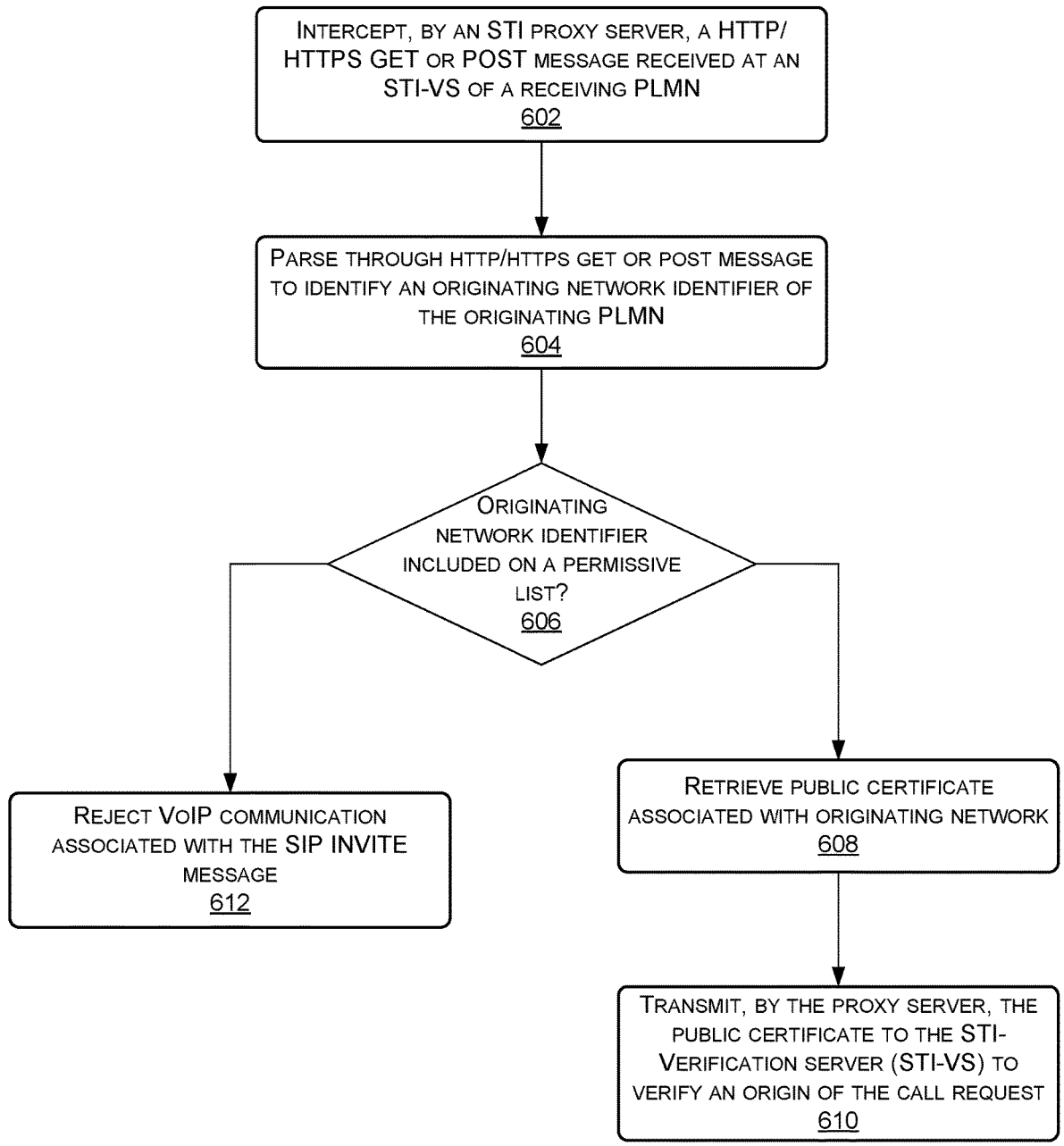
FIG. 6 illustrates a process for intercept a call request received at a PLMN and facilitating an STI-VS in authenticating an origin of the call request.

FIGS. 5 and 6 present processes 500 and 600 that relate to operations of the STI proxy server 102. Each of the processes 500 and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are described with reference to the computing environment 100 of FIG. 1.

FIG. 5 illustrates a process for detecting a call request initiated within a PLMN and facilitating an STI-AS in providing attestation of the PLMN identity in an outgoing SIP INVITE message. Process 500 is presented from the perspective of the STI proxy server. The STI proxy server is configured to streamline the interaction between the PLMN and external servers, such as the STI-PA and STI-CA, to obtain a public STI certificate that, in part, facilitates the STI-AS in attesting to the PLMN identity.

At 502, the STI proxy server may determine that an Public STI certificate has expired or is set to expire within a predetermined time interval. In this example, the STI proxy server may retrieve the public STI certificate from an STI-CR. The predetermined time interval may be one day, one week, or thirty days. Any predetermined time interval is possible.

At 504, the STI proxy server may determine that the public STI certificate has expired or is set to expire. In doing so, the STI proxy server may select an STI-CA from a plurality of STI-CAs to obtain a public STI certificate. The STI proxy server may store and maintain a current list of STI-CAs from which it may obtain a public STI certificate. Alternatively, the current list of STI-CAs may be retrieved from an STI-KMS of the SHAKEN framework.

The public STI certificate is intended to attest to the identity of the originating PLMN, for use by the receiving PLMN to verify the identity of the originating PLMN. Since the STI proxy is configured to interact with a plurality of STI-CAs, the selection of an STI-CA may be dependent on the identity of the receiving PLMN. For example, consider an originating PLMN that has developed a trust relationship with a first STI-CA and a second STI-CA, such that the originating PLMN may request and receive a public STI-Certificate from either one of the first STI-CA or the second STI-CA. Next, consider a receiving PLMN that has developed a trust relationship with the first STI-CA but not the second STI-CA. In this instance, the originating PLMN may selectively obtain a public STI-Certificate from the first STI-CA, on the basis that the receiving PLMN has developed a trust relationship with the first STI-CA, and the intent of the public STI-Certificate is to attest to the identity of the originating PLMN from a trusted source. In an alternate embodiment, the STI proxy server may interact with an STI-PA of the SHAKEN framework to select the STI-CA from a plurality of STI-CAs.

At 506, the STI proxy server may perform acts to retrieve the public STI certificate from the selected STI-CA. For example, the STI proxy server may retrieve, from an SKS of an STI-KMS, an asymmetric public-private key pair for the purpose of obtaining the public STI certificate from the selected STI-CA.

At 508, the STI proxy server may retrieve the new public STI certificate from the selected STI-CA. In one example, the STI proxy server may use the public key of the asymmetric public-private key pair in an interaction with an STI-PA to obtain an authentication token. The authentication token may then be used to retrieve the public STI certificate from the selected STI-CA. In another example, the STI proxy server may directly interact with the selected STI-CA to obtain the public STI certificate.

At 510, the STI proxy server may store the public STI certificate within the certificate repository to allow for an efficient recall of the public STI certificate at a later point in time. The certificate repository may be configured to store public STI certificates indefinitely, or alternatively, for a predetermined time interval that is governed by the expiration of the public STI certificates.

At 512, the STI proxy server may transmit, to an STI-AS, the private key that is a counterpart to the public key associated with the public STI certificate. In this example, the STI-AS may use the private key to sign a Personal Assertion Token (PASSporT) within a SIP identity header of the outgoing SIP INVITE message. Further, the STI proxy server may provide the STI-AS with a notification that the public STI certificate is stored within the certificate repository.

FIG. 6 illustrates a process for intercept a call request received at a PLMN and facilitating an STI-VS in authenticating an origin of the call request. Process 600 is presented from the perspective of the STI proxy server. In this process, the STI proxy server is configured to verify the origin of the call request. Doing so will ensure that the PLMN is not inundated with communications intended for fraudulent or nuisance purposes.

At 602, the STI proxy server may intercept a HTTP/HTTPS GET or POST message received at an STI-VS received at a PLMN. The Hyper Text Transfer Protocol (HTTP)/HTTP Secure (HTTPS) GET or POST message may correspond to an incoming SIP INVITE message. The HTTP/HTTPS GET or POST message may be intercepted at the S-CSCF of the receiving PLMN or the STI-VS. The HTTP/HTTPS GET or POST message are intended to request information from a server. In this example, the HTTP/HTTPS GET or POST message is intended to retrieve a public STI certificate from the STI proxy server.

STI proxy server may intercept the call request at the P-CSCF or the S-CSCF of the IMS core. The call request may correspond to a SIP INVITE message. The SIP INVITE message may include a SIP identity header which conveys the proven identity of the originating PLMN of the SIP INVITE message.

At 604, the STI proxy server may parse through the SIP identity header of the SIP INVITE message to infer an identity of the originating PLMN of the SIP INVITE message. In some examples, the SIP identity header may include an originating network identifier associated with the originating PLMN.

At 606, the STI proxy server may compare the originating network identifier of the originating PLMN with a list of permissible networks that the receiving PLMN is permitted to interact. The STI proxy server may maintain the list of permissible networks in real-time to ensure that incoming call requests from suspect PLMNs do not overwhelm the resources of the telecommunication network.

At 608, the STI proxy server may determine that the originating PLMN is included within the list of permissible networks. In doing so, the STI proxy server may retrieve the public STI certificate associated with the originating PLMN. In one example, the STI proxy server may retrieve the public STI certificate from the STI-CR. In another example, the STI proxy server may determine that the public STI certificate is not available within the STI-CR, and in doing so, interact with a peer-CR to retrieve the public STI certificate.

At 610, the STI proxy server may transmit the public STI certificate to the STI-VS. The STI-VS may use the public STI certificate to validate the Personal Assertion Token (PASSporT) within the SIP identity header of the SIP INVITE message, thereby validating the origin of the call request. Recall that the PASSporT is digitally signed using a private key of an asymmetric key pair that is a counterpart to the public key associated with the public STI certificate.

In response to verifying an identity of the originating PLMN, the STI-VS may transmit an indication to the STI proxy server indicating the same, at which time the STI proxy server may re-direct the SIP INVITE message to the point at which it was intercepted within the IMS core, such as the S-CSCF.

At 612, the STI proxy server may determine that the originating PLMN is not included within the list of permissible networks. In this example, the STI proxy server may choose not to re-direct the SIP INVITE message to the point at which it was intercepted within the IMS core, such as the S-CSCF. In doing so, the call request associated with the SIP INVITE message may timeout and fail to establish a VoIP communication.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A Secure Telephone Identity (STI) proxy server associated with a first Public Land Mobile Network (first PLMN), comprising:
   one or more processors;
   memory coupled to the one or more processors, the memory including one or more modules that are executable by the one or more processor to:
   determine that a first public STI certificate associated with the first PLMN is set to expire within a predetermined time interval;
   receive, from an STI Certificate Authority, an updated first public STI certificate associated with the first PLMN;
   store, within a certificate repository, the updated first public STI certificate;
   transmit, to an STI-Authentication Server (STI-AS), a notification indicating that the updated first public STI certificate associated with the first PLMN is stored within the certificate repository;
   receive a call request from an originating device within a second PLMN, the second PLMN being different from the first PLMN;
   infer an identity of the second PLMN based at least in part on a network identifier associated with the call request;
   determine whether the second PLMN is permitted to interact with the first PLMN;
   in response to the second PLMN being permitted to interact with the first PLMN, retrieve a second public STI certificate associated with the second PLMN; and
   transmit the second public STI certificate to an STI Verification Server (STI-VS) associated with the first network, the STI-VS to use the second public STI certificate to verify that an origin of the call request corresponds to the second PLMN.

2. The STI proxy server of claim 1, wherein the call request corresponds to a Session Initiation Protocol (SIP) INVITE message, the SIP INVITE message further including SIP identity header, and
   wherein the network identifier is included within the SIP identity header of the SIP INVITE message.

3. The STI proxy server of claim 1, wherein the one or more modules are further executable by the one or more processors to:
   retrieve, from a data store, a Uniform Resource Identifier (URI) list of permissible PLMNs that are authorized to interact with the first PLMN, and
   wherein, to determine whether the second PLMN is permitted to interact with the first PLMN is based at least in part on a comparison of the network identifier with data entries of the URI list of permissible PLMNs.

4. The STI proxy server of claim 3, wherein the one or more modules are further executable by the one or more processors to:
   in response to determining that the second PLMN is not permitted to interact with the first PLMN, rejecting the call request.

5. The STI proxy server of claim 1, wherein the one or more modules are further executable by the one or more processors to:
   transmit a certificate request to a peer-CR associated with the second PLMN; and
   retrieve the public STI certificate from the peer-CR, based at least in part on the certificate request.

6. The STI proxy server of claim 1, wherein the one or more modules are further executable by the one or more processors to:
   retrieve, from an STI Key Management Server (STI-KMS), an asymmetric key pair associated with the first PLMN, the asymmetric key pair including a private key and a public key;
   transmit, to the STI-AS, the private key, the STI-AS to use the private key to digitally sign an outgoing SIP INVITE message associated with the second PLMN.

7. The STI proxy server of claim 1, wherein the one or more modules are further executable by the one or more processors to:
   retrieve, from an STI-Policy Administrator (STI-PA), a secure list of approved STI-CAs to facilitate receipt of the public STI certificate; and
   select the STI-CA from the secure list of approved STI-CAs.

8. The STI proxy server of claim 1, wherein the one or more modules are further executable by the one or more processors to:
- transmit, to an STI-PA, a token request associated with retrieval of the first public STI certificate from the STI-CA, the token request including the public key; and
- receive, from the STI-PA, the token, and
- wherein, to transmit the certificate request to the STI-CA further includes transmitting the token to the STI-CA.

9. The STI proxy of claim 1, wherein the one or more modules are further executable by the one or more processors to:
- receive, from the STI-VS, a Hyper Text Transfer Protocol (HTTP)/HTTP Secure (HTTPS) GET message or an HTTP/HTTPS POST message that is associated with verifying the call request, and
- wherein, to infer an identity of the second PLMN occurs in response to the HTTP/HTTPS GET message or the HTTP/HTTPS POST message.

10. A computer-implemented method, comprising:
under control of one or more processors:
- receiving a call request from an originating device within a first PLMN, the call request intended to initiate a voice communication with a recipient device within a second PLMN, the first PLMN being different from the second PLMN;
- inferring an identity of the first PLMN, based at least in part on a network identifier associated with the call request;
- retrieving a first public STI certificate associated with the first PLMN;
- transmitting the first public STI certificate to an STI-VS associated with the second PLMN, the STI-VS to use the first public STI certificate to verify that an origin of the call request corresponds to the first PLMN;
- determining that a second public STI certificate that is associated with the second PLMN is set to expire within a predetermined time interval;
- receiving, from the STI-CA, the new second public STI certificate;
- storing, within a certificate repository, the new second public STI certificate; and
- transmitting, to an STI-AS, a notification indicating that the new second public STI certificate is stored within the certificate repository.

11. The computer-implemented method of claim 10, further comprising:
- retrieving, from a data store, a URI list of permissible networks that are authorized to interact with the second PLMN; and
- determining whether the first PLMN is permitted to interact with the second PLMN, based at least in part on a comparison of the network identifier with data entries of the URI list of permissible networks, and
- wherein, retrieving the public STI certificate is based at least in part on the first PLMN being permitted to interact with the second PLMN.

12. The computer-implemented method of claim 10, further comprising:
- retrieving the public STI-certificate from a peer CR.

13. The computer-implemented method of claim 10, further comprising:
- transmitting, to an STI-CA, a certificate request for a new second public STI certificate associated with the second PLMN, and
- wherein, receiving the new second public STI certificate is based at least in part on transmitting the certificate request.

14. The computer-implemented method of claim 10, further comprising:
- retrieving, from an STI-KMS, an asymmetric key pair associated with the second PLMN, the asymmetric key pair including a private key and a public key; and
- transmitting, to the STI-AS, the private key, the STI-AS to use the private key to digitally sign outgoing SIP INVITE messages associated with the second PLMN.

15. One or more non-transitory computer-readable media storing computer-executable instructions that, when executed on one or more processors, cause the one or more processors to perform acts comprising:
- determining that a public STI certificate associated with a PLMN is set to expire within a predetermined time interval;
- retrieving, from an STI-KMS, an asymmetric key pair associated with the PLMN, the asymmetric key pair including a private key and a public key;
- transmitting, to an STI-CA, a certificate request for a new public STI certificate associated with the first PLMN that includes the public key;
- receiving, from the STI-CA, the new public STI certificate; and
- transmitting, to an STI-AS, a notification associated with the new public STI certificate and the private key, the STI-AS to use the private key to digitally sign an outgoing SIP INVITE messages associated with the PLMN.

16. The one or more non-transitory computer-readable media of claim 15, further storing instructions that, when executed cause the one or more processors to perform acts comprising:
- storing, within a certificate repository, the new public STI certificate, and
- wherein, the notification indicates that the new public STI certificate associated with the PLMN is stored within the certificate repository.

17. The one or more non-transitory computer-readable media of claim 15, further storing instructions that, when executed cause the one or more processors to perform acts comprising:
- retrieving, from an STI-PA, a secure list of approved STI-CAs to facilitate receipt of the Public STI certificate; and
- selecting, from the secure list of approved STI-CAs, the STI-CA.

18. The one or more non-transitory computer-readable media of claim 15, further storing instructions that, when executed cause the one or more processors to perform acts comprising:
- transmitting, to an STI-PA, a token request associated with retrieval of the Public STI certificate from the STI-CA, the token request including the public key; and
- retrieving, from the STI-PA, the token, and
- wherein, to transmit the certificate request to the STI-CA further includes the transmitting the token to the STI-CA.

19. The one or more non-transitory computer-readable media of claim 15, wherein the PLMN is a first PLMN, and the new public STI certificate is a first public STI certificate, and further storing instructions that, when executed cause the one or more processors to perform acts comprising:

receiving an additional call request from a recipient device within a second PLMN, the second PLMN being different from the first PLMN;

retrieving, from a peer CR associated with the second PLMN, a second public STI certificate associated with the second PLMN; and transmitting the second public STI certificate to an STI-VS associated with the first PLMN, the STI-VS to use the public STI certificate to verify that an origin of the additional call request corresponds to the second PLMN.

20. The one or more non-transitory computer-readable media of claim 19, further storing instructions that, when executed cause the one or more processors to perform acts comprising:

inferring an identity of the second PLMN based at least in part on a network identifier associated with the call request;

retrieving, from a data store, a URI list of permissible networks that are authorized to interact with the PLMN; and determining whether the second PLMN is permitted to interact with the first PLMN, based at least in part on comparing the network identifier with the URI list of permissible networks, and wherein, retrieving the second public STI certificate is based at least in part on the determining that the second PLMN is permitted to interact with the first PLMN.

* * * * *